Oct. 14, 1941.  H. W. MILLER  2,259,171
SELF-SEALING BALL JOINT
Filed June 8, 1940
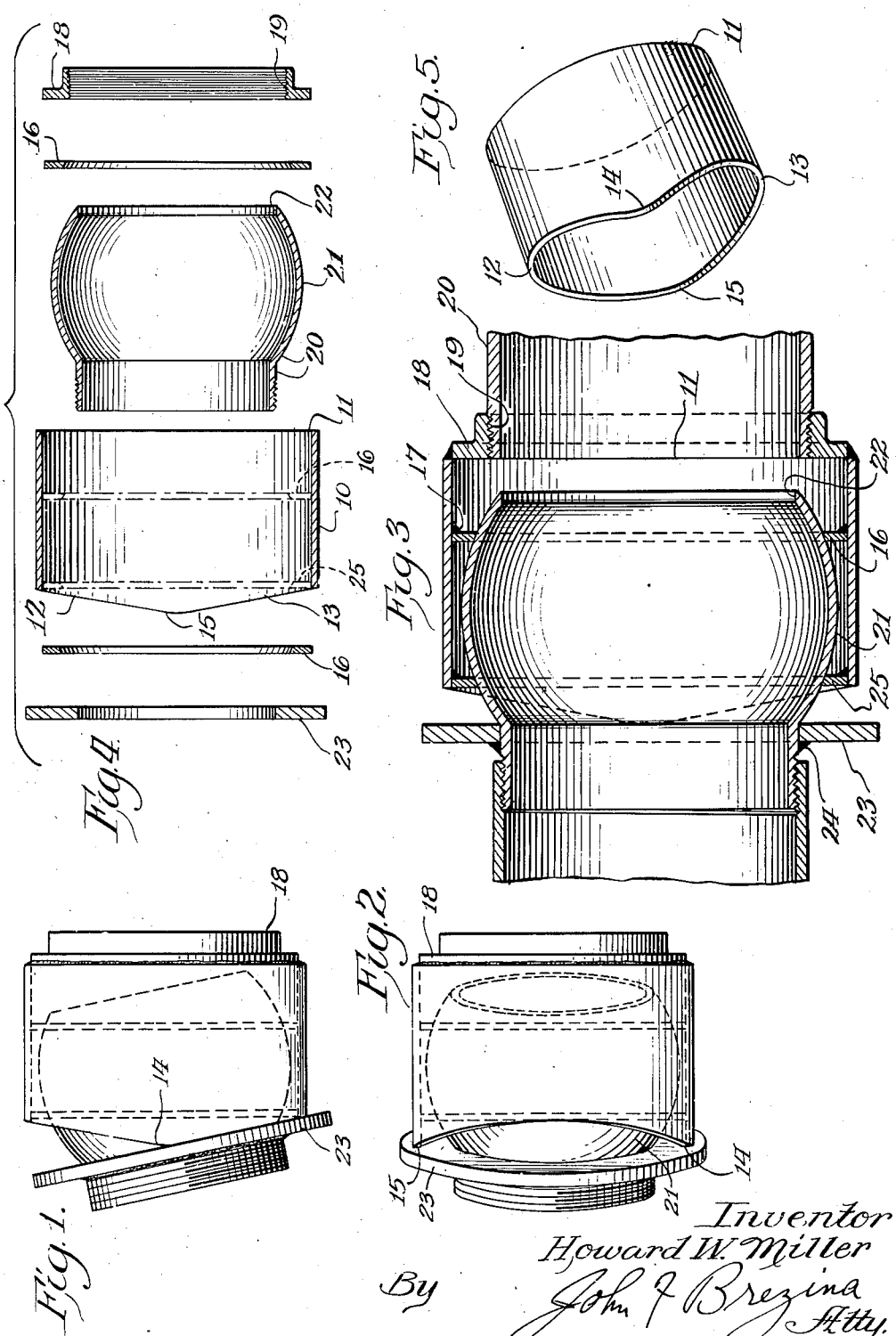
Inventor
Howard W. Miller
By John F. Brezina
Atty.

Patented Oct. 14, 1941

2,259,171

UNITED STATES PATENT OFFICE 2,259,171

SELF-SEALING BALL JOINT

Howard W. Miller, Wausau, Wis.

Application June 8, 1940, Serial No. 339,435

5 Claims. (Cl. 285—91)

This invention is directed to a novel self-sealing joint or fitting for pipes, conduits and the like, and is especially advantageously adaptable for use in any location or installation where movement, vibration or other bending is encountered by the different sections of a pipe, conduit or communication channel.

One type of installations where ball joint fittings of this type are needed are in connection with transportation vehicles, for example where either liquid, gas or vapor is conducted from the power tractor of a truck to the transportation body itself, either for the purpose of heating or cooling the merchandise containing unit.

My invention has for one of its objects the provision of a novel ball joint or ball jointed fitting adapted to be always sealed and providing a jointed connection between two portions of communication line of pipe, conduit or the like.

A further object of my invention is the provision of an inexpensive ball jointed fitting which forms connecting sections of a communication channel or line which will always remain effectively sealed against exit of liquid, gas or vapor which is passed through the communication line, and which also provides a substantially sealed compartment which prevents an undesirable amount of heat loss in either direction.

A further object of my invention is the provision of a ball jointed fitting which may be used in any one of numerous methods and installations, for example guard rails, porch rails or the like and which is inexpensively made and installed.

Other and further objects of my invention will be apparent from the following descriptions and claims. This invention is in the preferred form.

Fig. 1 is a side elevational view of my invention showing the conduit ball joint of my invention in one position.

Fig. 2 is an elevational view thereof looking at the top of Fig. 1.

Fig. 3 is an enlarged cross sectional view taken on a longitudinal vertical plane.

Fig. 4 is an exploded and cross sectional view of the respective parts comprising one form of my invention before assembly thereof.

Fig. 5 is a perspective view of the outer cylinder member.

Referring to the drawing, numeral 10 designates a metal sleevelike cylindrical member or collar which is preferably of greater diameter than length and whose annular edge 11 is preferably formed on a transverse single plane. The opposite annular end of said cylindrical member 10 is shaped to form a pair of substantially semicircular edges 12 and 13 which merge at the diametrically opposite integral humps or projecting portions indicated by reference numerals 14 and 15 as clearly shown in the drawing. The length of the cylindrical member 10 may be varied to desire and according to the particular use.

Reference numeral 16 designates a flat metal ring of a diameter so that same fits snugly within said cylindrical member 10 in substantially the positions intermediate its ends as illustrated in Figs. 3 and 4 respectively, and which is securely mounted in such position by welding 17 or the like.

Numeral 18 is an internally threaded metal ring of size adapted to fit over or into the straight cut off end of cylindrical member 10, and which may be of any desired cross section construction, and which in the illustration of the drawing is shown as of angular cross section provided with a projecting annular flange. Ring 18 is illustrated as provided with optional internal threads 19 to provide for the conventional mounting of a correspondingly threaded pipe or conduit section 20, a segment of which is illustrated in Fig. 3. Such pipe or conduit may be secured and connected by any other presently known means such as welding or the like.

A tubular fitting 20 having an integral portion thereof formed into an enlarged ball portion 21 terminates in an open end 22 as clearly shown in Figs. 3 and 4. The ball portion 21 at its greatest diameter is greater than the diameter of the opening in ring 16, and is adapted to slidably fit into and engage the ring 16 as shown in Figs. 2 and 3.

The ball member is secured within cylindrical member 10 by securing metal ring 25 within cylindrical member 10 and at the end thereof, and in such a position that the interior annular edge (which may be optionally beveled), of ring 25 frictionally and slidably engages the exterior surface of the ball member 21. The ring 16 is preferably secured in position in the described manner after insertion of the ball member 21. 20 as stated.

In assembly of the unit, the ball member 21 is inserted in the position shown in Fig. 3 by inserting the reduced end first and so that its rounded surface frictionally engages the inner preferably beveled edge of ring 25. The ring 16 is secured in place as by welding so that ball member 21 is pivotally locked in position.

The exterior metal collar 23 is secured upon the cylindrical portion 20 of ball member 21 by suitable means, as for example by welding 24 shown in Fig. 3.

The cylindrical shank portion 20 of ball member 21 may optionally be exteriorly or interiorly threaded to provide for the conventional connection of a conduit or pipe as illustrated at the left of Fig. 3.

One important feature of my invention is the construction embodying the projecting portions 14 and 15 which form the juncture of the semicircular edges 21 and 13 respectively and which cooperate with exterior rings 23 to limit movement of the joint in either direction. It will be apparent that as the ball member or portion is moved in either direction to either extreme position, the surface of the ring 23 will come to rest upon either the edge 14 or edge 15 to thereby form a stop for movement in either direction.

A further important feature of my construction is the economical arrangement and assembly of inexpensively stamped parts which when assembled form a pivotal sealed joint between communicating pipe or conduit sections and which provides for more than the required pivotal movement in most requirements. The extreme position in one direction of the assembled sealed joint is illustrated in Figs. 1 and 2.

It will be apparent that my afore described invention provides an inexpensive jointed fitting for pipes, conduits and other enclosed communication lines, and which is adaptable for numerous uses both in stationary and portable installations.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim as my invention:

1. In a flexible pipe fitting, a sleeve-like cylindrical member; a pair of inwardly extending metal flanges secured in parallel spaced apart relation in said cylindrical member; a ball shaped member having inlet and outlet openings and having its rounded surface in slidable engagement with the inner edge surfaces of said flanges respectively; and an integral sleeve-like neck portion extending outwardly from said ball shaped portion to provide for connecting the same to a pipe; and a metal collar about said outwardly extending portion of said member adapted to engage the exterior of said cylindrical member to limit movement of said ball member.

2. In a flexible pipe fitting, a sleeve-like cylindrical member; a pair of inwardly extending metal flanges secured in spaced apart relation in said cylindrical member and transversely thereof, said annular metal flanges being in parallel spaced apart planes and extending inwardly at substantially right angles to the cylindrical wall of the cylindrical member; a ball shaped metal passaged member having its rounded exterior surface in slidable sealing engagement with said inwardly extending flanges, said inwardly extending extra flanges preventing said ball shaped member from moving longitudinally within said cylindrical member, said ball shaped member having an outwardly extending portion adapted to be connected to a pipe or the like; and an outwardly extending metal collar mounted on said outwardly extending portion of said ball member and adapted to limit the pivoting movement of said ball member.

3. A flexible ball joint connection for pipes or the like comprising in combination a metal cylindrical member having diametrically opposite integral extensions at one end thereof; a pair of inwardly extending flanges mounted in spaced apart position in said cylindrical member; a ball shaped member mounted in sealed engagement between said inwardly extending flanges of said cylindrical member, said ball shaped member having one end projecting exteriorly; a metal outwardly projecting collar on said projecting end of said ball member; said collar being adapted to engage the end surfaces of said cylindrical member between the integral end projections thereof to thereby limit the relative movement of said ball member.

4. A flexible ball joint connection for pipes or the like comprising in combination a metal cylindrical member having diametrically opposite integral extensions at one end thereof; a pair of inwardly perpendicularly extending substantially parallel annular flanges mounted in spaced apart position in said cylindrical member the inner annular edge surfaces of said flanges being beveled in directions toward each other to form oppositely inclined seating surfaces; a ball shaped member mounted in sealed engagement between said inwardly extending flanges of said cylindrical member and in seating engagement with said inner seating surfaces, said ball shaped member having one end projecting exteriorly; a metal outwardly projecting collar on said exteriorly projecting end of said ball member, said collar being adapted to engage the arcuate end surfaces of said cylindrical member between said integral end projections to thereby limit the relative movement of said ball member; and a threaded connection ring on the end of said cylindrical member.

5. A flexible ball joint connection for pipes or the like comprising, in combination, a metal cylindrical member having a diametrically opposite integral extension at one end thereof, the edges of said extension being angularly disposed with reference to each other; a pair of perpendicularly and inwardly extending flange members mounted in spaced apart position in said cylindrical member; a ball shaped member mounted in sealed engagement between the inner annular edges of said inwardly extending flanges mounted in said cylindrical member, said ball shaped member having one end projecting exteriorly; a metal outwardly projecting collar on said exteriorly projecting end of said ball member; said collar being adapted to engage the end surfaces of said cylindrical member between the integral end projections thereof to limit the pivotal movement of said ball member; and a pipe connection element on the opposite end of said cylindrical member.

HOWARD W. MILLER.